July 31, 1934.  A. P. LOFSTRAND  1,968,781
AUTOMATIC GRAIN SHOCKER
Filed Sept. 14, 1933   4 Sheets-Sheet 3

Inventor
Albin P. Lofstrand

By Geo. P. Kimmel
Attorney

July 31, 1934.   A. P. LOFSTRAND   1,968,781
AUTOMATIC GRAIN SHOCKER
Filed Sept. 14, 1933    4 Sheets-Sheet 4

Inventor
*Albin P. Lofstrand*

By *Geo. P. Kimmel*
Attorney

Patented July 31, 1934

1,968,781

UNITED STATES PATENT OFFICE 1,968,781

AUTOMATIC GRAIN SHOCKER

Albin Paulus Lofstrand, Chicago, Ill.

Application September 14, 1933, Serial No. 689,468

14 Claims. (Cl. 56—422)

This invention relates to an automatic grain shocker and has for its primary object to improve the construction and increase the efficiency and utility of the grain shockers disclosed by Letters Patent 1,340,781 and 1,569,230 granted to me May 18, 1920 and January 12, 1926 respectively.

A further object of the invention is to provide, in a manner as hereinafter set forth, a grain shocker including means whereby a dump receptacle or drum for the bundle of grains to form the shock or stock is shifted to and returned from dumping position without the employment of intermeshing gears and racks.

A further object of the invention is to provide, in a manner as hereinafter set forth, a grain shocker having means operated from a traction wheel of the apparatus to cause the moving of the dumping drum for the bundles of grain to a position to form the shock or stock.

A further object of the invention is to provide, in a manner as hereinafter set forth, a grain shocker including a receptacle for dumping bundles of grain to form the shock or stock, and with means operated from and automatically coupled to a traction wheel of the apparatus to cause the receptacle to be moved to dumping position when the receptacle is filled with bundles of grain and automatically disconnected from said wheel when the receptacle is at dumping position.

A further object of the invention is to provide, in a manner as hereinafter set forth, a grain shocker including a traveling conveyor for conducting the bundles of grain to the dumping position and means for automatically discontinuing the operation of the conveyor when the receptacle arrives at dumping position.

To the above ends essentially, and to others which may hereinafter appear, the invention consists of such parts, and such combination of parts which fall within the scope of the invention as claimed.

Figure 1:
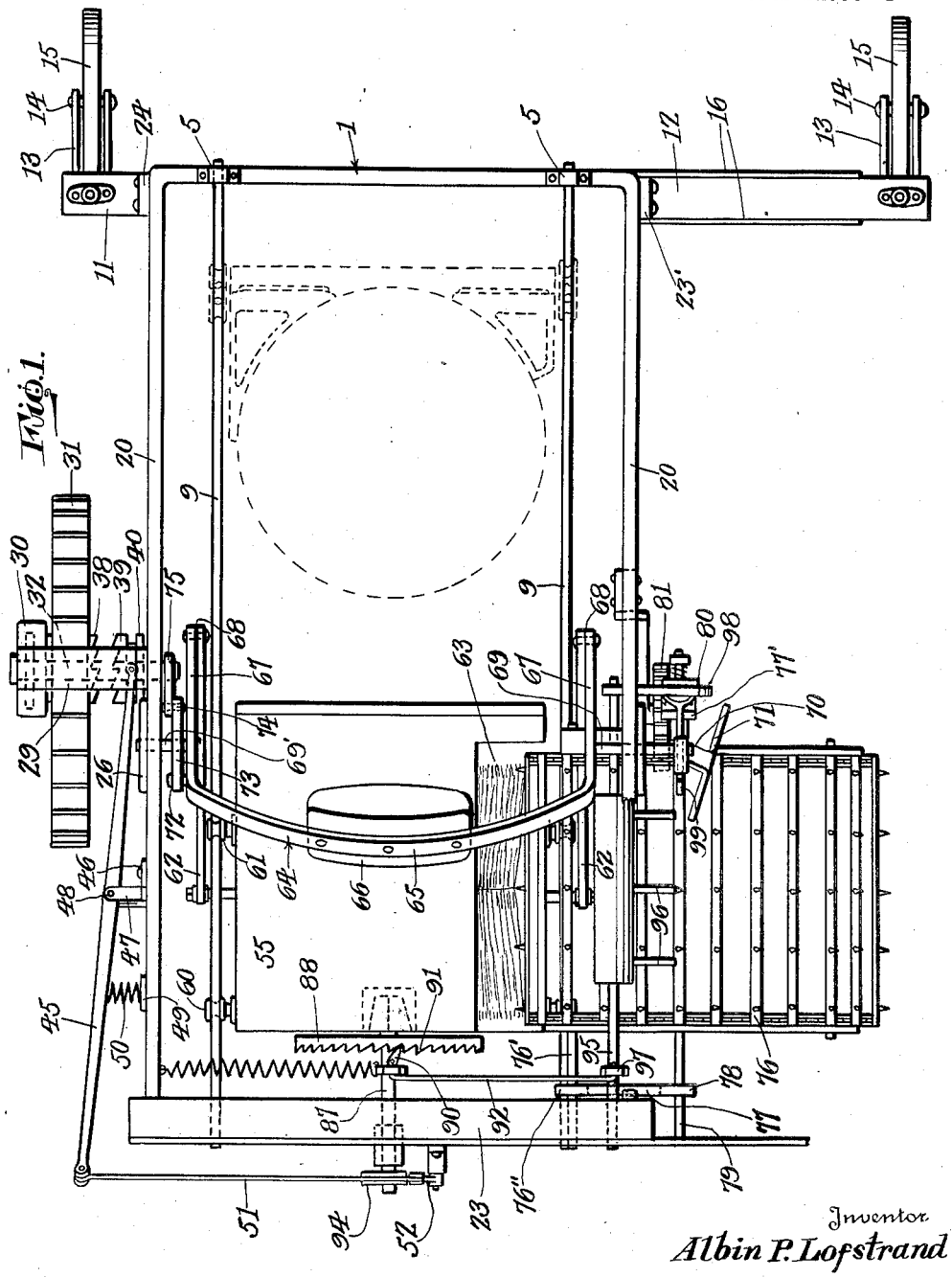
Figure 1 is a top plan view of the grain shocker.

In the drawings, 1 denotes the body of the apparatus or machine and which is in the form of a skeleton structure. Anchored, as at 2, to the lower part 3 of the front end, as at 5, to the upper part 6 of the rear end and, as at 7, to an intermediate part 8 of the rear end of body 1 are spaced pairs of track members extending upwardly from front to rear. The track members of each pair are arranged in superposed spaced relation and indicated at 9, 10. The members 9 are the upper members of the pairs and have their rear or upper ends secured as indicated at 5. The members 10 are the lower members of the pairs and have their upper or rear ends secured as indicated at 7. The front or lower ends of the track members are secured as indicated at 2. Each track member includes a lower straight front stretch, an upper straight rear stretch and an inclined intermediate stretch which extends upwardly from its front to its rear stretch. The front stretch of the members 9 are of less length than those of members 10. The intermediate stretches of members 10 are of less length than those of members 9. Each pair of track members is arranged within and in proximity to a side of body 1.

The body 1 at each side of its rear has a lateral extension. The extensions are designated 11, 12, the former being of greater length than the latter. The extensions have depending therefrom yokes 13 in which are journaled the shafts 14 of rear supporting wheels 15 for body 1. Bracing bars 16 are provided for extension 12.

Figure 3:
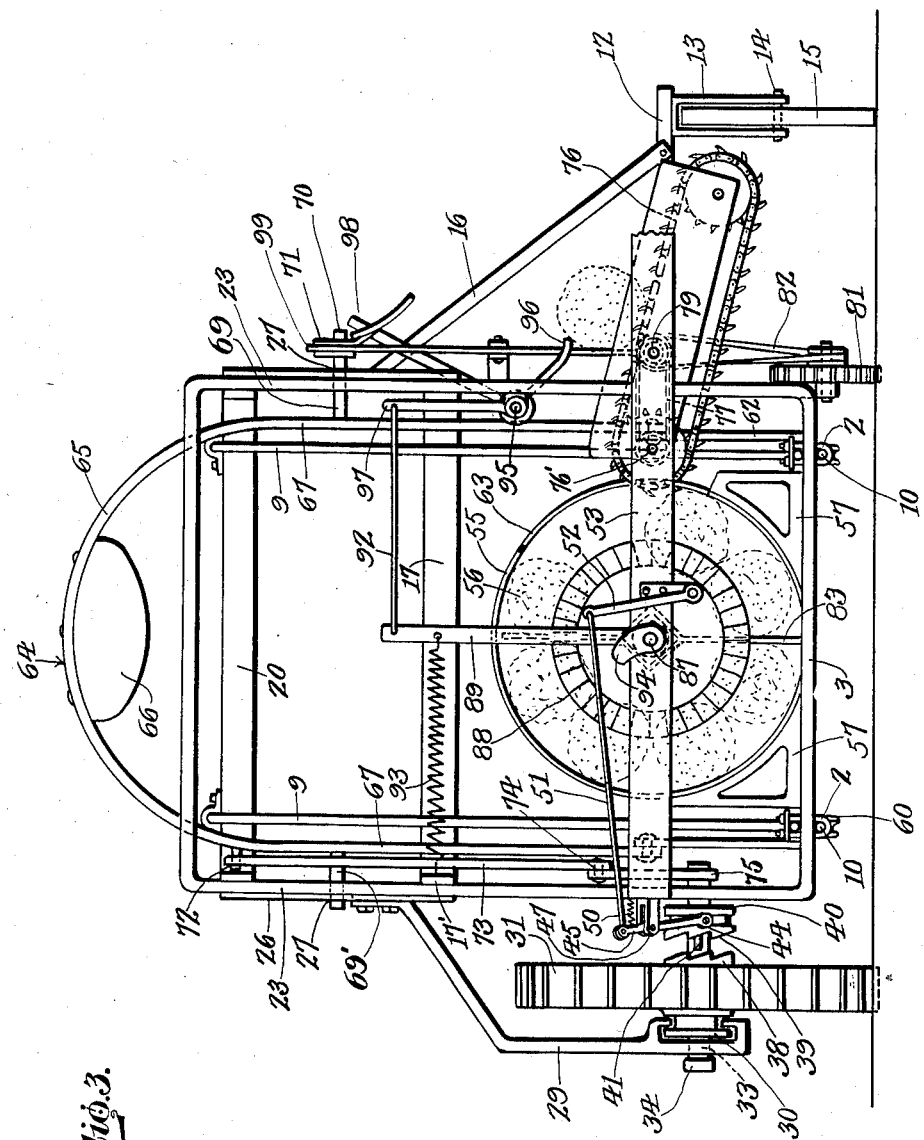
Figure 3 is an end view.
Figure 4:
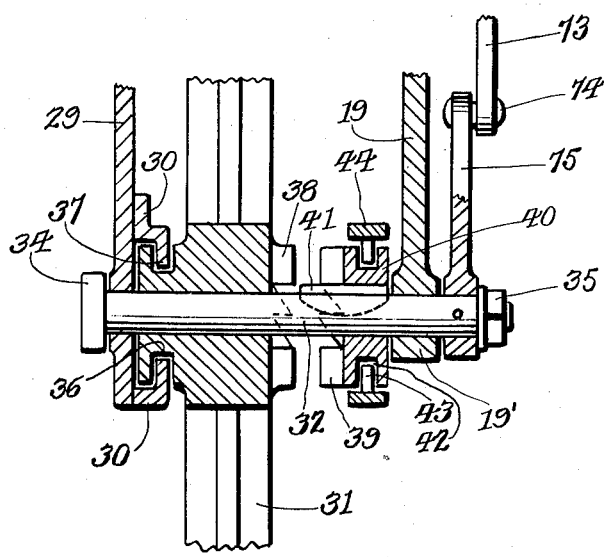
Figure 4 is a fragmentary view in section showing the means driven from a supporting wheel of the apparatus for elevating the dumping receptacle.

The body 1 below its top includes a U-shaped frame 17 having its closed end anchored at the rear end of said body. The frame 17 extends lengthwise of body 1 and has one side thereof, indicated at 17', of greater length than its other side. One side of body 1 intermediate its ends is formed with a vertical hanger member 19 provided with a bearing 19' at its lower end, Figures 1 and 4. The top of body 1 is in the form of a horizontally U-shaped frame 20 having its closed end secured to the rear end of body 1, as at 21, and its open end secured to the front of body 1, as at 22. The front end of body 1 is in the form of a vertically disposed rectangular frame 23 and to one side of which the side 17' of frame 17 is secured. The hanger member 19 is anchored at its upper end to one side of frame 20 and intermediate its ends to side 17' of the frame 17. The rear end of body 1 consists of a pair of parallel spaced uprights 23', 24 and the closed ends of the frames 17 and 20. The lateral extensions 11, 12 are at the lower ends of the uprights 23', 24 respectively. Each side of body 1 intermediate the ends thereof is provided with a depending support. These supports are designated 25, 26 and are anchored to the sides of frames 17 and 20. The supports 25, 26 are formed with openings 27 which align with each other. Anchored at its upper end to the hanger member 19, as at 28, is an outwardly directed depending angle-shaped hanger arm 29 provided on its inner face, at its lower end with a pair of superposed spaced oppositely extending angle-shaped retaining flanges 30 for a traction wheel 31, Figures 3 and 4. The wheel is loosely mounted on an axle or shaft 32 which extends through an opening 33 in the lower end of arm 29 and is formed with a head 34 at its outer end.

The shaft 32 extends through bearing 19' and carries on its inner end a retaining means 35. The hub 36 of the wheel 31 is preferably grooved, as at 37, and extending into the groove 37 are the flanges 30 to prevent wheel 31 bodily shifting inwardly upon shaft 32 towards the hanger member 19. The head 34 and retaining means coact to arrest the inward or outward shift of shaft 32 with respect to wheel 31 and member 19. The inner end of the hub 36 carries a clutching member 38 adapted to coact with a clutching member 39 extended from a slidable collar 40 for the purpose of clutching the wheel to shaft 32 to provide for the rotating of the latter from wheel 31. The collar 40 is keyed, as at 41, to shaft 32. The collar 40 is peripherally grooved, as at 42, to receive the pins 43 carried by a yoke 44. The latter straddles collar 40 and is positioned at one end of an inclined spring controlled pivoted shifting bar 45 therefor. Side 17' of frame 17 carries a hanger 46 to which a yoke 47 is attached. The bar 45 extends through yoke 47 and is pivotally connected to the latter, as at 48. The side 17' of frame 17 carries a hanger 49 to which is anchored a controlling spring 50 for bar 45. The latter inclines from its front end to its rear end and extends beyond frame 23. The front end of bar 45 has attached thereto one end of a pull member 51. The other end of the latter is attached to the upper end of a lever 52. Secured against the lower portion of frame 23, extending transversely of the latter, as well as projecting beyond one side of said frame is a supporting member 53 standing on a lengthwise edge thereof. Anchored to member 53 intermediate its ends is a depending bracket 54, to the lower end of which is pivotally connected the lower end of lever 52.

Within the body 1 is arranged a bodily shiftable nonrotatable dumping receptacle 55 of cylindrical drumlike form open at each end and provided to receive the bunches 56 of grain for the purpose of forming a shock or stock therefrom when dumped. Spaced parallel pairs of laterally disposed enlargements 57, 58 and 59 are integral with the bottom of the receptacle 55. The enlargements of each pair extend in opposite directions. Each enlargement 57 carries a pair of superposed spaced rollers 60 for traveling against and for confining the receptacle 55 upon a track member 10. Each enlargement 59 carries a pair of superposed spaced rollers 61 for traveling against and for confining the receptacle 55 upon a track member 9. Each enlargement 58 has pivotally connected thereto the lower or front end of a normally upwardly inclined link 62. The links are arranged outwardly with respect to the track members. The receptacle 55 has its body formed with a lengthwise extending opening 63, Figure 1, for the entrance of a bunch 56 of grain therein.

Figure 2:
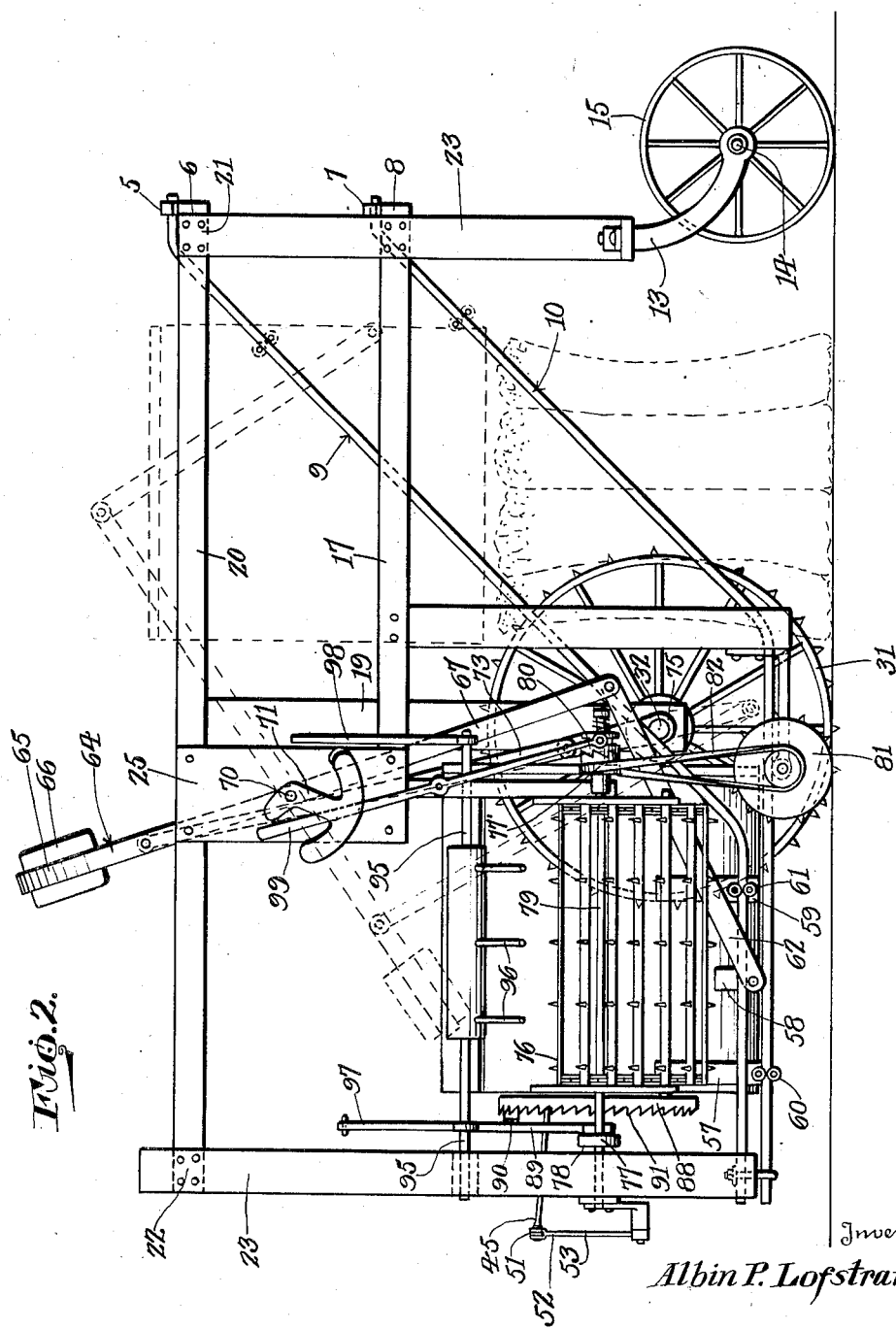
Figure 2 is a side elevation and illustrating in dotted lines the receptacle or drum in dumping position and the shock.

Arranged within the body 1 and outwardly with respect to the track members is a shiftable counterbalanced pivotally mounted yoke 64 which when shifted in one direction, provides in connection with the links 62 for the shifting of the receptacle 55 to dumping position, such as shown in dotted lines, Figure 2. The normal position of the yoke 64 is as shown in full lines, Figure 2, and which tends to maintain the receptacle 55 normally in the position as shown in full lines, Figure 2. The yoke 64 is inverted and has its closed upper end 65 provided centrally thereof with a counterweight 66. The lower ends of the sides 67 of yoke 64 are pivotally connected, as at 68, to the rear ends of links 62. Fixed to the sides 67 of yoke 64, as well as extending laterally therefrom in opposite directions is a pair of pivot shafts 69, 69' for the yoke 64, and which are journaled in supports 25, 26. The end portion 70 of shaft 69 extends outwardly from support 25 and carries a cam 71 for a purpose to be referred to.

Pivotally connected, as at 72 to and above the lower end of one of the sides 67 of yoke 64 is one end of a link 73. The other end of the latter is pivotally connected, as at 74 to the outer end of a crank arm 75, bodily carried with shaft 32 at its inner end, Figures 1 and 4.

The construction and arrangement of the yoke 64 with respect to shaft 32 and links 62 provide for the shifting of receptacle 55 to dumping position when wheel 31 is clutched to shaft 32 to cause the operation of the latter.

The clutch structure between wheel 31 and shaft 32 is automatically moved to and held in clutching engagement when receptacle 55 is filled with bunches of grain resulting in the shifting of the receptacle to dumping position. When the receptacle arrives at dumping position the clutching structure is automatically released and shifted to non-clutching position by its controlling spring. The manner in which the foregoing is accomplished will now be referred to.

A conveyor 76 is provided for delivering the bunches of grain through opening 63 into receptacle 55. The conveyor is disposed laterally to and supported from body 1 and driven by a transmission belt 77, the latter being operated from a pulley 78 carried by a counter-shaft 79 which extends through the conveyor 76. The drive shaft of the conveyor is designated 76' carrying a pulley 76'' with which engages the belt 77. The shaft 79 carries a loose pulley 77' adapted to be clutched thereto by a clutching means 80 slidably keyed on said shaft 79. Operated from one of the traction wheels 81 of the apparatus, is an endless belt 82 for driving pulley 77' whereby when clutched to shaft 79, the conveyor will be operated. The conveyor is not driven during the dumping operation due to the fact that at such time the clutching means 80 is clear of pulley 79. The manner in which this is accomplished will be hereinafter referred to.

Figure 5:
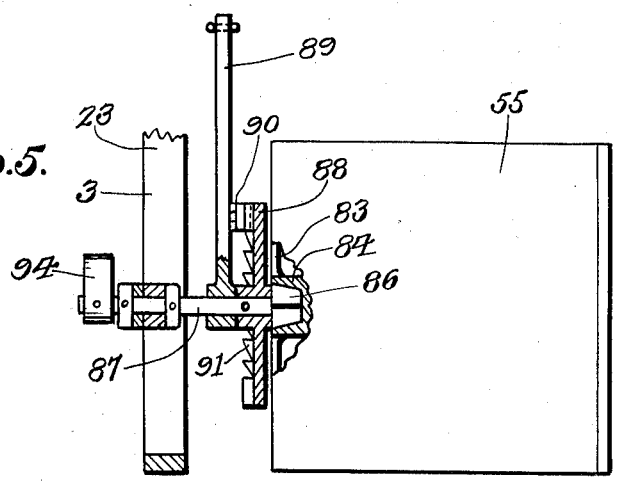
Figure 5 is a fragmentary view in sectional plan illustrating the means for intermittently rotating the grain bundle shifting device arranged within the dumping receptacle.

Within the receptacle 55 is an intermittently operable shifting means 83 for the bundles of grain as they are fed into said receptacle. Said means 83 includes a hub 84, Figure 5, provided with a squared socket 85 at one end. Positioned in the socket 85 is the polygonal shaped rear end 86 of an intermittently rotatable shaft 87 which is journaled in support 53 and extends forwardly of the latter. Fixed to shaft 87 in proximity to but forwardly of end 86 is a ratchet disc 88 intermittently engaged and shifted by an upstanding oscillatory ratchet lever 89 provided with a dog 90 successively engaging with the teeth 91 on the front face of disc 88. The lever 89 at its lower end is loosely mounted on the shaft 87 and is of a length to extend above disc 88. The upper end of lever 89 has attached thereto a pull member 92 therefor, and adjacent said end lever 89 has connected thereto a controlling spring 93 extending in an opposite direction with respect to member 92. The front end of shaft 87 carries a cam 94 which bodily moves therewith. The lever 52 is arranged in the path of cam 94.

Arranged over the conveyor 76 and supported from body 1 is an actuating mechanism for lever 89. The said mechanism is intermittently operated by the bunches of grain as they are supplied to receptacle 55, and is also given an impulse by cam 71 when receptacle 55 arrives at dumping position. The said actuating mechanism includes a shaft 95 provided intermediate its ends with a series of spaced depending fingers 96, adjacent its front end with an upstanding crank 97 attached to pull member and at its rear end with an upstanding crank arm 98 of greater length than crank arm 97. The latter is normally perpendicular with respect to body 1. The arm 98 is inclined outwardly with respect to body 1 and is arranged in the path of cam 71.

The fingers 96 are disposed in the path of the bunches of grain moving up the conveyor. Each bunch abuts the fingers and moving them inwardly until they are cleared by the bunch. As the fingers are moved inwardly, shaft 95 is rotated in a direction away from body 1 carrying crank arm 97 in a like direction whereby member 92 is pulled outwardly against the actuation of spring 93. On the pulling outwardly of member 92 lever 89 is carried therewith to impart an impulse to disc 88 which in turn will carry shaft 87 in a like direction. As shaft 87 moves, cam 94 moves therewith. On a complete revolution of shaft 87, cam 94 will be brought against lever 52 to move it outwardly on its pivot whereby bar 45 will be moved in a direction to provide for the clutching of shaft 32 to wheel 31. At such point shaft 32 will be operated causing the moving of yoke 64 in a direction to shift receptacle 55 to dumping position. The shaft 69 will move with yoke 64.

Pivotally supported from body 1 and arranged in the path of cam 71, is an inclined spring controlled shifting device 99, Figure 2, normally tending to maintain the clutching means 80 in position to clutch pulley 79 to shaft 78 to drive conveyor 76. When shaft 69 pivots during the shifting of yoke 64 from shaft 32, the cam 71 will come into engagement with shifting device 99 and move it in a direction to uncouple pulley 79 from shaft 78 whereby the operation of the conveyor 76 will be discontinued until cam 71 clears the upper end of device 99.

The release of the clutching mechanism between wheel 31 and shaft 32 is had by imparting an impulse to shaft 95 when receptacle 55 is returned to receiving position and which in turn through crank arm 97, lever 89, disc 88 shifts shaft 87 in a direction to have cam 94 clear lever 52 releasing bar 45 whereby spring 50 will act to shift member 39 clear of member 38 releasing wheel 31 from shaft 32. This action is had by shaft 69 causing cam 71 to engage and move crank arm 98 to rock shaft 95, when yoke 64 is operated from shaft 32 in a direction to move the receptacle 55 to receiving position. The shaft 95, fingers 96 and crank arms 97, 98 are returned to normal position by the spring 93. When yoke 64 moves to normal position, the shafts 69, 69' move in an opposite direction to arrange cam 71 in position to subsequently engage crank arm 97 and device 99.

What I claim is:—

1. In a mobile grain shocker of that type including traction wheels, a slidable combined bunch receiving and bunch dumping receptacle, a shiftable counterbalanced pivoted structure pivoted to and for moving said receptacle from receiving to dumping position, a shaft upon which one of the traction wheels of the shocker is loosely mounted, means operated from said shaft, when the latter is clutched to said wheel, for shifting said structure in a direction to move said receptacle from bunch receiving position to and from bunch dumping position, a clutching mechanism for said wheel and shaft, means intermittently operated by the bunches of grain when conveyed to said receptacle for actuating said mechanism in a direction to clutch the shaft to the wheel and for latching said mechanism in clutching position, and said structure provided with means substantially as described having provisions for operating said means to release said clutching mechanism when said receptacle reaches receiving position.

2. In a mobile grain shocker of that type including traction wheels, a slidable combined bunch receiving and bunch dumping receptacle, a shiftable counterbalanced pivoted structure pivoted to and for moving said receptacle from receiving to dumping position, a shaft upon which one of the traction wheels of the shocker is loosely mounted, means operated from said shaft when the latter is clutched to said wheel, for shifting said structure in a direction to move said receptacle from bunch receiving position to and from bunch dumping position, a clutching mechanism for said wheel and shaft, means intermittently operated by the bunches of grain when conveyed to said receptacle for actuating said mechanism in a direction to clutch the shaft to the wheel and for latching said mechanism in clutching position, a conveyor mechanism leading to said receptacle for conveying bunches of grain to the latter, driving means for said conveyor operated from another of the traction wheels of the shocker, a clutching means for said driving means, and said structure provided with means substantially as described having provisions for releasing said clutching means when the loosely mounted wheel and shaft are clutched together and for operating said intermittently operable means to release said clutching mechanism when the receptacle is returned to receiving position.

3. In a mobile grain shocker of that type including traction wheels, a slidably mounted combined bunch receiving and bunch dumping receptacle for bunches of grain to provide a shock or stock, a gravity controlled counterbalanced pivoted slidably mounted yoke pivoted to and for shifting said receptacle from receiving position to and from dumping position, a shaft upon which one of the traction wheels of the shocker is loosely mounted, means operated from said shaft, when the latter is clutched to said wheel, for shifting said structure in a direction to move said receptacle to dumping position, a normally inactive clutching mechanism for said shaft and wheel, an intermittently revoluble device provided with means having provisions after a complete revolution of said means for making active said clutching mechanism and for latching it in active position to provide for the operation of the shifting means for said structure, a structure intermittently operated by bunches of grain when conveyed to said receptacle for intermittently operating said device, and said yoke provided with means substantially as described having provisions for operating said device to release said clutching mechanism when said receptacle is returned to receiving position.

4. In a mobile grain shocker of that type including traction wheels, a slidably mounted bunch receiving and bunch dumping receptacle for bunches of grain to provide a shock or stock, a gravity controlled counterbalanced pivoted slidably mounted yoke pivoted to and for shifting said receptacle from receiving position to and from dumping position, a shaft upon which one of the traction wheels of the shocker is loosely mounted, means operated from said shaft, when the latter is clutched to said wheel, for shifting said structure in a direction to move said receptacle to dumping position, a normally inactive clutching mechanism for said shaft and wheel, an intermittently revoluble device provided with means having provisions after a complete revolution of said means for making active said clutching mechanism and for latching it in active position to provide for the operation of the shifting means for said yoke, a structure intermittently operated by bunches of grain when conveyed to said receptacle for intermittently operating said device, a conveyor mechanism leading to said receptacle for conveying bunches of grain to the latter, driving means for said conveyor operated from another traction wheel of the vehicle, a clutching means for said driving means, and said yoke provided with means substantially as described having provisions for releasing said clutching means when said loosely mounted wheel and shaft are clutched together and for operating said device to release said clutching mechanism when the receptacle is returned to receiving position.

5. In a grain shocker, a combined bunch receiving and bunch dumping receptacle, a normally inactive pivotally supported slidable structure bodily carrying said receptacle and providing when active to move the latter from receiving position to and from dumping position, a normally inactive driving means for said structure, a normally active conveyor leading to said receptacle when the latter is in receiving position, operating means for the conveyor, a shiftable structure operated from the bunches supplied to the receptacle for making said driving means active at spaced intervals, a shiftable mechanism for making said operating means inactive at spaced intervals, and said shiftable structure including normally inactive shiftable parts adapted when active to successively actuate said mechanism and device to respectively discontinue the operation of the conveyor during the operation of said driving means and for discontinuing the operation of the latter when the receptacle is returned to receiving position, and means operated from said slidable structure when the latter is operated for successively making active said shiftable parts.

6. In a grain shocker, a combined bunch receiving and bunch dumping receptacle, a normally inactive pivotally supported slidable structure bodily carrying said receptacle and providing when active to move the latter from receiving position to and from dumping position, a normally inactive driving means for said structure, a normally active conveyor leading to said receptacle when the latter is in receiving position, operating means for the conveyor, a shiftable structure operated from the bunches supplied to the receptacle for making said driving means active at spaced intervals, a shiftable mechanism for making said operating means inactive at spaced intervals, said shiftable structure including normally inactive shiftable parts adapted when active to successively actuate said mechanism and device to respectively discontinue the operation of the conveyor during the operation of said driving means and for discontinuing the operation of the latter when the receptacle is returned to receiving position, means operated from said slidable structure when the latter is operated for successively making active said shiftable parts, and said slidable structure being formed with a counterweight at its rear bodily moving therewith.

7. In a grain shocker, a combined bunch receiving and bunch dumping receptacle, a normally inactive pivotally supported slidable structure bodily carrying said receptacle and providing when active to move the latter from receiving position to and from dumping position, a normally inactive driving means for said structure, a normally active conveyor leading to said receptacle when the latter is in receiving position, operating means for the conveyor, a shiftable structure operated from the bunches supplied to the receptacle for making said driving means active at spaced intervals, a shiftable mechanism for making said operating means inactive at spaced intervals, said shiftable structure including normally inactive shiftable parts adapted when active to successively actuate said mechanism and device to respectively discontinue the operation of the conveyor during the operation of said driving means and for discontinuing the operation of the latter when the receptacle is returned to receiving position, means operated from said slidable structure when the latter is operated for successively making active said shiftable parts, and said shiftable structure including a revoluble cam and shiftable means operated from the cam at a point during the revolution of the latter for making said driving means active.

8. In a grain shocker, a combined bunch receiving and bunch dumping receptacle, a counterbalanced pivotally mounted mechanism pivoted to said receptacle for moving it from receiving position to and from dumping position, driving means for shifting said mechanism in a direction to move said receptacle from receiving position to and from dumping position, means for making active said driving means, a conveyor for conducting bunches of grain to said receptacle intermittently operable, operating means for the conveyor, means for making active said operating means, and said mechanism having its pivot provided with means for making active said operating means during the operation of the driving means and for making inactive said driving means when the receptacle is returned to receiving position.

9. In a grain shocker, a slidable combined bunch receiving and bunch dumping receptacle, a counterbalance pivotally mounted mechanism pivotally connected to said receptacle for moving the latter from bunch receiving position to and from bunch dumping position, driving means operated from and on the travel of a traction wheel of the shocker for shifting said mechanism in a direction to move said receptacle from bunch receiving position to and from bunch dumping position, means operated from the bunches supplied to the receptacle for coupling said driving means to the wheel to be operated from the latter, and said mechanism provided with means substantially as described having provisions coacting with the means for making active said driving means for uncoupling the latter from the wheel when the receptacle is returned to receiving position.

10. In a grain shocker, a combined bunch receiving and bunch dumping receptacle, a normally inactive pivotally supported slidable structure bodily carrying said receptacle and providing when active to move the latter from receiving position to and from dumping position, a normally inactive driving means for said structure, a normally active conveyor leading to said receptacle when the latter is in receiving position, operating means for the conveyor, a shiftable structure operated from the bunches supplied to the receptacle for making said driving means active at spaced intervals, a shiftable mechanism for making said operating means inactive at spaced intervals, said shiftable structure including normally inactive shiftable parts adapted when active to successively actuate said mechanism and device to respectively discontinue the operation of the conveyor during the operation of said driving means and for discontinuing the operation of the latter when the receptacle is returned to receiving position, means operated from said slidable structure when the latter is operated for successively making active said shiftable parts, said shiftable structure including an intermittently revoluble shaft, a cam fixed to the latter and bodily carried therewith, and shiftable means operated from the cam at a point during the revolution of the latter for making said driving means active to an extent to provide for the shifting of the receptacle from receiving position to and from dumping position.

11. In a grain shocker, a combined bunch receiving and bunch dumping receptacle, a normally inactive pivotally supported slidable structure bodily carrying said receptacle and providing when active to move the latter from receiving position to and from dumping position, a normally inactive driving means for said structure, a normally active conveyor leading to said receptacle when the latter is in receiving position, operating means for the conveyor, a shiftable structure operated from the bunches supplied to the receptacle for making said driving means active at spaced intervals, a shiftable mechanism for making said operating means inactive at spaced intervals, said shiftable structure including normally inactive shiftable parts adapted when active to successively actuate said mechanism and device to respectively discontinue the operation of the conveyor during the operation of said driving means and for discontinuing the operation of the latter when the receptacle is returned to receiving position, means operated from said shiftable structure when the latter is operated for successively making active said shiftable parts, opposed spaced pairs of superposed tracks, and trolley forming means carried by the receptacle, traveling on said tracks and coupling the receptacle to the tracks.

12. In a grain shocker, a combined bunch receiving and bunch dumping receptacle normally disposed in bunch receiving position, a shiftable counterbalanced means pivotally connected to said receptacle for normally holding the latter in bunch receiving position and for moving the receptacle from bunch receiving position to and from bunch dumping positions, and means connected to said counterbalanced means for shifting the latter against the action of its counterbalance in a direction to move the receptacle from bunch receiving to and for suspending it in bunch dumping position.

13. In a grain shocker, a combined bunch receiving and bunch dumping receptacle normally disposed horizontally in bunch receiving position, said receptacle being open at one side for the passage of the bunches therein and at one end for the dumping of the bunches therefrom, a shiftable pivotally mounted counterbalanced shifting means pivotally connected to the sides of said receptacle for normally holding the latter in bunch receiving position and for moving the receptacle from bunch receiving to and from bunch dumping position, supporting means for said counterbalanced means, and means connected to said counterbalanced means for shifting the latter against the action of its counterbalance in a direction to move the receptacle from bunch receiving to and for suspending it in bunch dumping position.

14. In a grain shocker, a combined bunch receiving and bunch dumping receptacle normally disposed in bunch receiving position, a shiftable counterbalanced means for normally holding said receptacle in bunch receiving position and for moving it from receiving position to and from dumping position, said means being pivotally connected at one end to said receptacle, pivotally supported intermediate its ends and having its counterbalance at the other of its ends, and means connected to said counterbalanced means for shifting the latter against the action of its counterweight in a direction to move the receptacle from bunch receiving to and suspending it in bunch dumping position.

ALBIN PAULUS LOFSTRAND.